(12) United States Patent
Gauss

(10) Patent No.: US 9,568,134 B2
(45) Date of Patent: Feb. 14, 2017

(54) FLUID CONVEYENCE SYSTEM CONNECTOR

(75) Inventor: Jason C. Gauss, Jackson, MI (US)

(73) Assignee: Eaton Corporation, Cleveland, OH (US)

( * ) Notice: Subject to any disclaimer, the term of this patent is extended or adjusted under 35 U.S.C. 154(b) by 325 days.

(21) Appl. No.: 14/237,279

(22) PCT Filed: Aug. 1, 2012

(86) PCT No.: PCT/US2012/049128
§ 371 (c)(1),
(2), (4) Date: Jul. 23, 2014

(87) PCT Pub. No.: WO2013/022665
PCT Pub. Date: Feb. 14, 2013

(65) Prior Publication Data
US 2014/0361532 A1 Dec. 11, 2014

Related U.S. Application Data

(60) Provisional application No. 61/515,447, filed on Aug. 5, 2011.

(51) Int. Cl.
*F16L 27/00* (2006.01)
*F16L 27/12* (2006.01)

(52) U.S. Cl.
CPC .............. *F16L 27/12* (2013.01); *Y10T 29/494* (2015.01)

(58) Field of Classification Search
CPC ...... F16L 27/12; F16L 27/026; F16L 27/0816; Y10T 29/494

(Continued)

(56) References Cited

U.S. PATENT DOCUMENTS 1,171,311 A * 2/1916 Blackwood et al. ... F16L 27/12
193/30
1,363,974 A * 12/1920 Heylman ................. F16L 27/12
277/621

(Continued)

FOREIGN PATENT DOCUMENTS

DE 88869 C 4/1895
DE 88869 A 3/1972

OTHER PUBLICATIONS

Espacenet Bibliographic Data Sheet indicating "Abstract not available for DD88869A".

(Continued)

*Primary Examiner* — Brian Mattei
(74) *Attorney, Agent, or Firm* — Fishman Stewart PLLC

(57) ABSTRACT

A fluid conveyance system connector includes a body and a tube positioned within the body through which a conveyed fluid flows. A moveable adapter is received in a first space between the body and the tube. The moveable adapter sealingly cooperates with the body and tube to define outer and inner variable volume chambers. The inner chamber communicates with one of an external environment or the conveyed fluid through a first port and the outer chamber communicates with the other of the conveyed fluid or the external environment through a second port such that the pressure in the inner chamber is the pressure exhibited by the external environment or the conveyed fluid and the pressure in the outer chamber is the pressure of the other of the conveyed fluid or the external environment. A differential pressure comprising a difference between the pressure of the conveyed fluid and the pressure exhibited by the external environment applies an inwardly or outwardly directed force to the moveable adapter.

14 Claims, 4 Drawing Sheets

(58) Field of Classification Search
USPC ........... 285/302, 100, 101; 14/302, 100, 101
See application file for complete search history.

(56) References Cited

U.S. PATENT DOCUMENTS

| | | | | |
|---|---|---|---|---|
| 2,438,312 | A | * | 3/1948 | Bunn .................... F16L 27/12 |
| | | | | 285/187 |
| 2,520,501 | A | | 8/1950 | Gulier et al. |
| 3,427,051 | A | | 2/1969 | White et al. |
| 3,427,951 | A | | 2/1969 | White et al. |
| 5,746,453 | A | * | 5/1998 | Roberts ................ F16L 59/185 |
| | | | | 285/298 |
| 6,257,625 | B1 | * | 7/2001 | Kitani .................... F16L 27/12 |
| | | | | 285/145.3 |
| 2011/0073366 | A1 | * | 3/2011 | Jaffari .................... F16L 25/01 |
| | | | | 174/84 R |
| 2012/0280487 | A1 | * | 11/2012 | Jaffari .................. F16L 27/026 |
| | | | | 285/45 |

OTHER PUBLICATIONS

International Search Report for PCT/US2012/049128.
Chinese Office Action for CN Application No. 201280038506.0 dated Feb. 28, 2015 with English Translation.

* cited by examiner

FLUID CONVEYENCE SYSTEM CONNECTOR

CROSS-REFERENCE TO RELATED APPLICATIONS

This application is a U.S. National Phase Application of PCT/US2012/049128, filed on Aug. 1, 2012, which claims priority to U.S. patent application Ser. No. 61/515,447 filed on Aug. 5, 2011 . The contents of both applications are hereby incorporated by reference in their entirety.

FIELD OF THE INVENTION

The present disclosure relates to fluid conveyance system connectors, including fluid conveyance system connectors used in an aerospace fluid conveyance system.

BACKGROUND

Aerospace vehicles, such as commercial aircraft, use fluid conveyance systems, such as hydraulic and fuel systems, to provide fluids to devices of the vehicle. Such devices may include, for example, hydraulically operated pumps and motors and aircraft engines. Fluid conveyance systems include various components, such as hoses, tubes and connectors, which cooperate to convey a fluid to one or more of the vehicle devices connected to the fluid conveyance system. In some systems, thermal expansion or contraction of the fluid conveyance system components may create certain undesirable conditions, such as buckling or sagging. Other undesirable conditions may be created due to the vibrational environment of the aircraft, such as excessive movement or stresses on the fluid conveyance system components.

SUMMARY OF THE INVENTION

A fluid conveyance system connector is provided that includes a body and a tube positioned within the body through which a conveyed fluid flows. A moveable adapter is received in a first space between the body and the tube. The moveable adapter sealingly cooperates with the body and the tube to define outer and inner variable volume chambers. The inner chamber communicates with one of an external environment or the conveyed fluid through a first port and the outer chamber communicates with the other of the conveyed fluid or the external environment through a second port such that the pressure in the inner chamber is the pressure exhibited by the external environment or the conveyed fluid and the pressure in the outer chamber is the pressure of the other of the conveyed fluid or the external environment. A differential pressure comprising a difference between the pressure of the conveyed fluid and the pressure exhibited by the external environment applies an inwardly or outwardly directed force to the moveable adapter.

In another embodiment of the invention, a fluid conveyance system connector is provided that includes a body having a flange and an elongated tube, positioned within the body and fixedly connected to the flange, through which a conveyed fluid flows. A first moveable adapter is received in a first space between the body and the tube on a first end of the connector and a second moveable adapter is received in a second space between the body and the tube on a second end of the connector. Each moveable adapter includes a sealing portion that sealingly engages an inner surface of the body and an external surface of the tube. A seal proximate each end of the body forms a seal between the body and each corresponding moveable adapter. Each moveable adapter cooperates with the body and the tube to define outer and inner variable volume chambers. The inner chamber communicates with one of an external environment or the conveyed fluid through a port in the body or tube and the outer chambers communicate with the other of the conveyed fluid or the external environment through a port in the moveable adapters or the body such that the pressure in the inner chambers is the pressure exhibited by one of the external environment or the conveyed fluid and the pressure in the outer chambers is the pressure of the other of the conveyed fluid or the external environment. A differential pressure comprising a difference between the pressure of the conveyed fluid and the pressure exhibited by the external environment applies an inwardly or outwardly directed force to each end of the connector.

A method of tuning or modifying the reaction to a vibrational input or environment in a fluid conveyance system is also provided.

BRIEF DESCRIPTION OF THE DRAWINGS

Embodiments of the invention will now be described, by way of example, with reference to the accompanying drawings.

DETAILED DESCRIPTION

Figure 1:
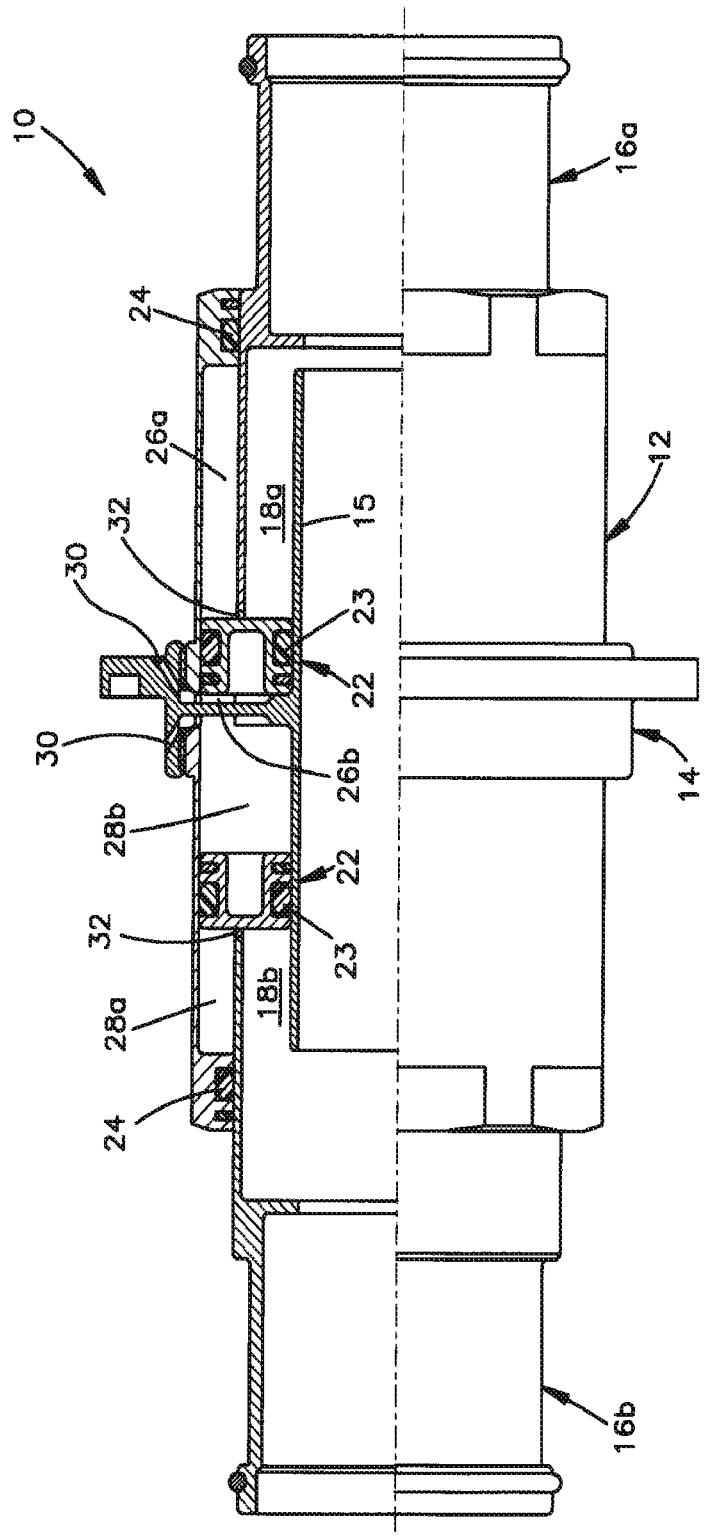
FIG. 1 is a cross-sectional view of a fluid conveyance system connector according to an embodiment of the present invention.

Referring now to the drawings, which are not intended to limit the invention, FIGS. 1-4 illustrate fluid conveyance system connectors according to embodiments of the present invention. Although not limited thereto, the illustrated embodiments of the invention are particularly suited for use in an aerospace (e.g., aircraft) fluid conveyance system.

Figure 2:
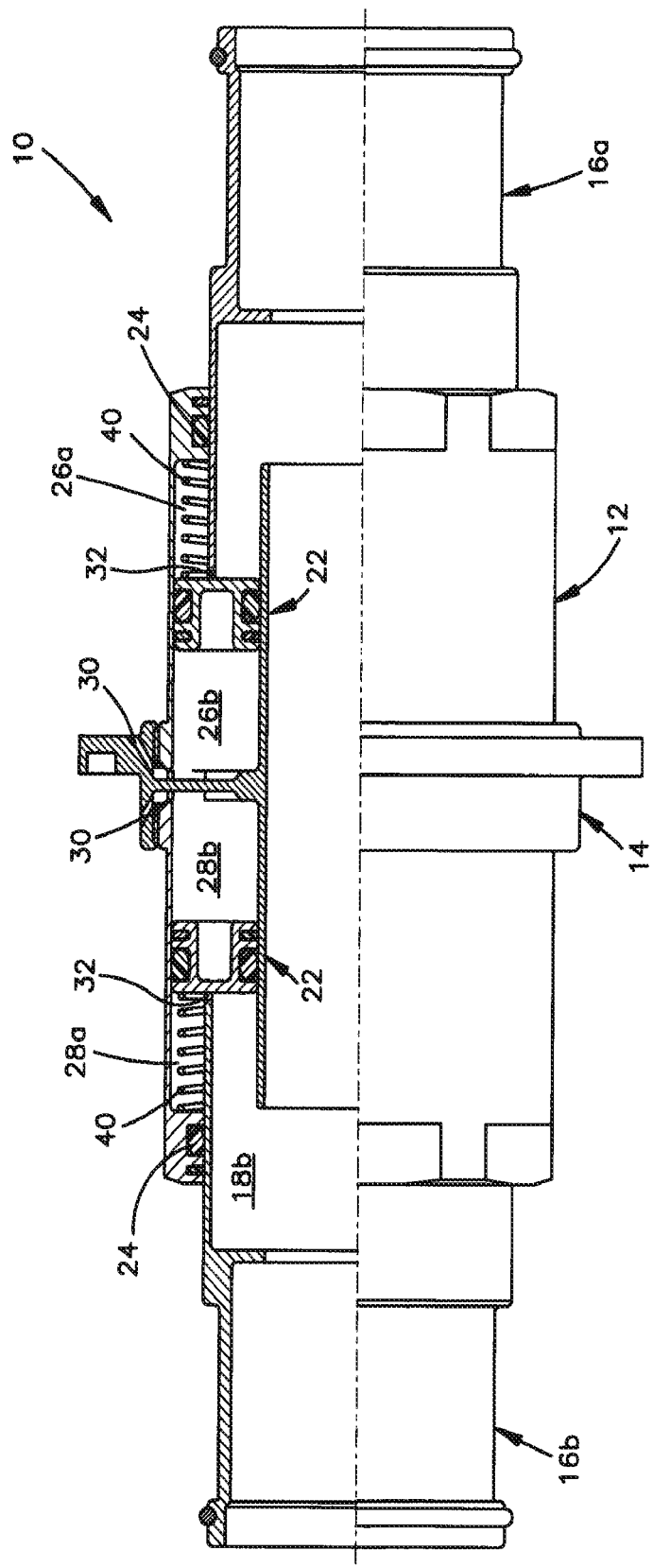
FIG. 2 is another cross-sectional view of the fluid conveyance system connector of FIG. 1, showing optional biasing members.

Referring to FIGS. 1 and 2, a connector 10 includes a body 12 having a flange 14. Flange 14 may be configured with one or more features to secure the connector 10 to some structure, such as an aircraft bulkhead or the like. Positioned within the body 12 and fixedly connected to the flange 14 is an elongated tube 15 through which a fluid (e.g., fuel, hydraulic fluid, air, etc.) flows. A first moveable adapter 16a is received in a first space 18a between the body 12 and the tube 15 on a first end of the connector and a second moveable adapter 16b is received in a second space 18b between the body 12 and the tube 15 on a second end of the connector 10. Each adapter includes a sealing portion 22 including a seal, such as an O-ring 23 or the like, which sealingly engages an inner surface of the body 12 and an external surface of the tube 15. A seal 24 is positioned proximate each end of the body 12 and forms a seal between the body 12 and each corresponding moveable adapter 16a, 16b. A portion of the body 12 within which the seal 24 is received may be connected to the flange 14 using a threaded connection or other suitable connection method, such as welding or brazing. When so constructed, each moveable adapter 16a, 16b cooperates with the body 12 and tube 15 to define outer and inner variable volume chambers 26a,b and 28a,b. In an embodiment of the invention, each inner chamber 26b, 28b communicates with the external environment or atmosphere through a port 30 in the flange 14. The outer chambers 26a, 28a communicate with the conveyed fluid via ports 32 in the moveable adapters 16a, 16b. Accordingly, the pressure in the inner chambers 26b, 28b is the pressure exhibited by the external environment and the pressure in the outer chambers 26a, 28a is the pressure of the fluid being conveyed by the connector 10.

Figure 3:
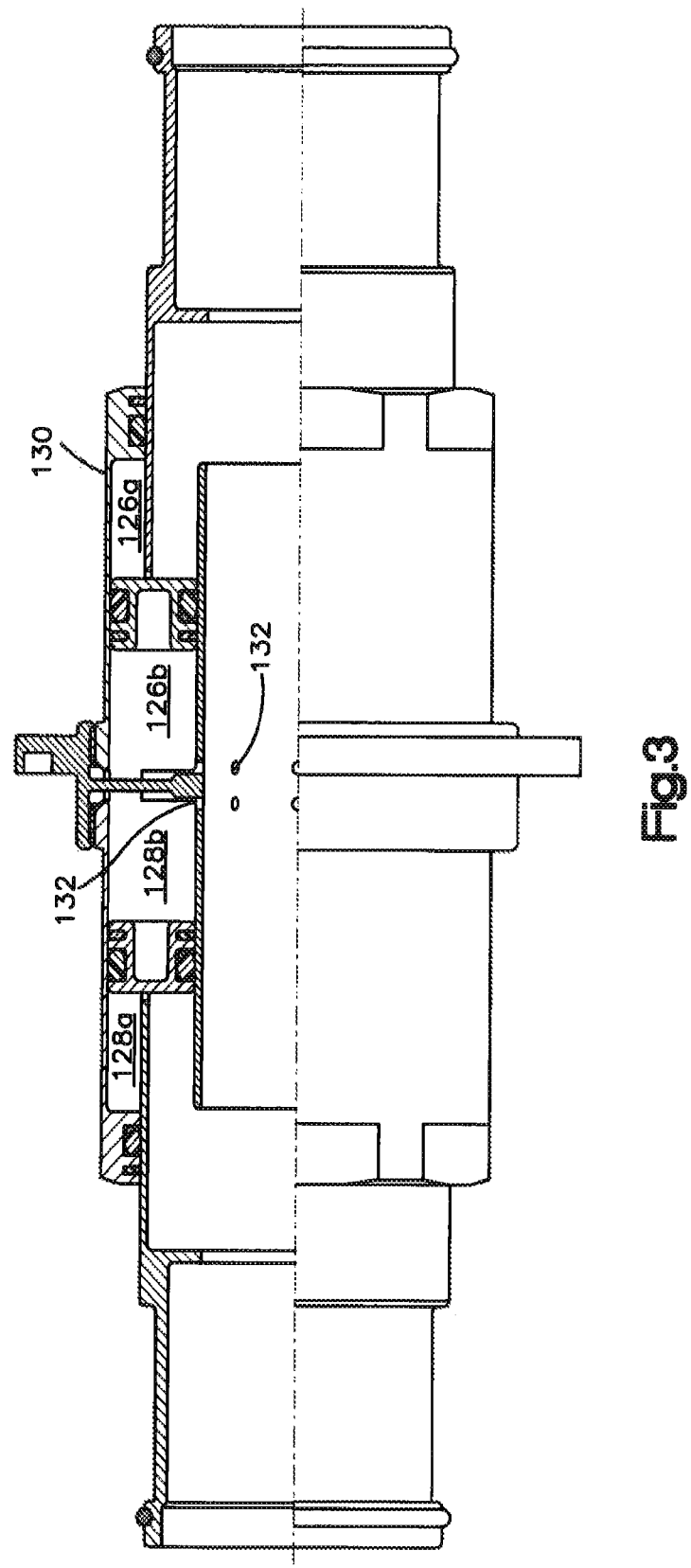
FIG. 3 is a cross-sectional view of a fluid conveyance system connector according to another embodiment of the present invention.
Figure 4:
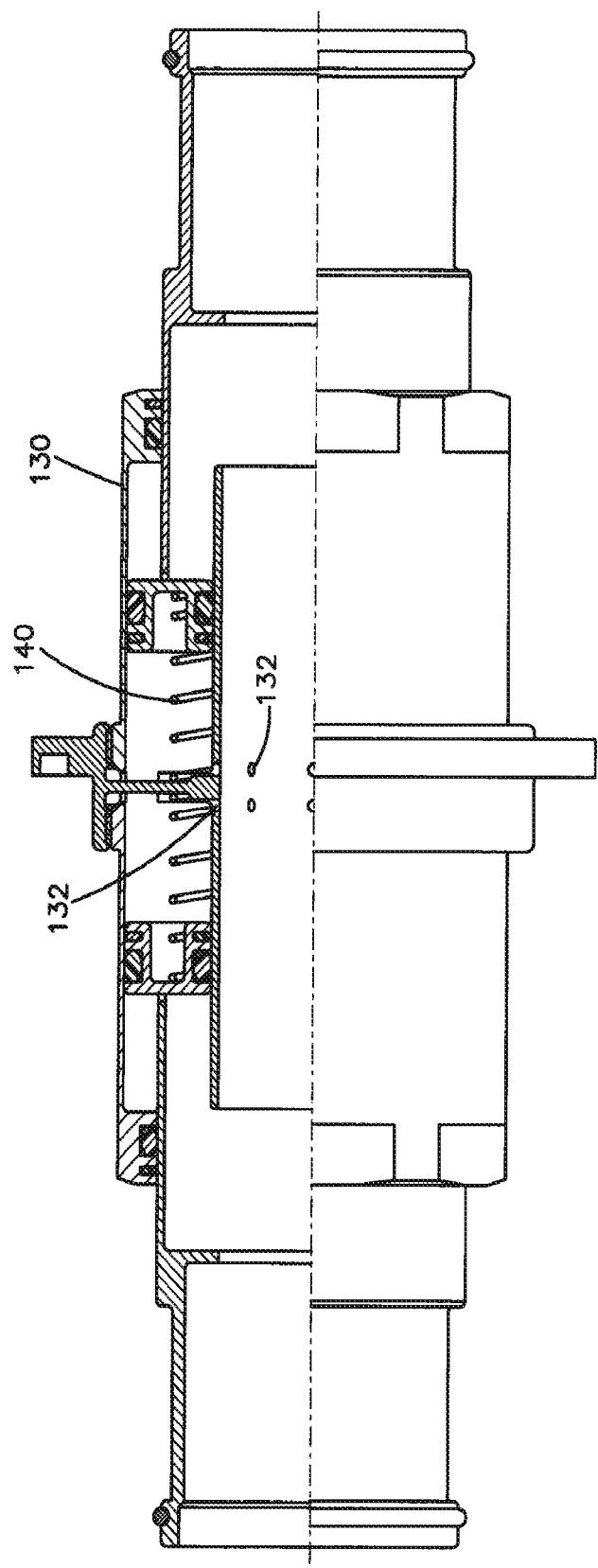
FIG. 4 is another cross-sectional view of the fluid conveyance system connector of FIG. 3, showing optional biasing members.

Another embodiment of the invention is shown in FIGS. 3 and 4. The embodiment shown in FIGS. 3 and 4 is substantially similar to the embodiment shown in FIGS. 1 and 2, except that the inner chambers 126b, 128b are provided in communication with the conveyed fluid via ports 132 and the outer chambers 126a, 128a are provided in communication with the external environment or atmosphere via ports 130.

As shown in FIGS. 2 and 4, a biasing member 40, 140 may be included in the inner 26/126b, 28/128b or outer 26/126a, 28/128a chambers to supplement, counter or replace the effect of system pressure (i.e., pressure of the conveyed fluid) or external pressure. The biasing member 40, 140 may include, without limitation, a compression spring.

As shown in FIGS. 1 and 2, differential pressure (i.e., the difference between the system pressure and the external pressure) is used to apply an inwardly direct force (tension) to the attached fluid conveying devices or components (not shown), such as, for example, hoses and tubing, which would be attached to the moveable adapters 16a, 16b at each end of the connector 10. In the illustrated embodiment, the moveable adapters 16a, 16b are configured to receive the end of a length of tubing and secure the tubing using a resilient clip; however, the present invention is not intended to be limited thereto. In the embodiment shown in FIGS. 3 and 4, the modified arrangement of ports within the connector enables the connector to apply an outwardly directed force (compression) to the attached fluid conveying device or component.

The connector described herein, through application of tension or compression, may be used to accommodate thermal expansion or contraction in a fluid conveyance system within which it is installed to prevent or inhibit certain system conditions, such as buckling or sagging. The connector of the present invention may also accommodate excessive movement or stresses on the fluid conveyance system components due to the vibrational environment of the aircraft.

It is believed that various alterations and modifications of the invention will become apparent to those skilled in the art from a reading and understanding of the specification. For example, sizing of the chambers can be adjusted to provide specific inward or outward forces due to system pressure to elicit the desired reaction of the fluid conveyance system to thermal expansion and/or vibrational inputs. It is intended that all such alterations and modifications are included in the invention, insofar as they come within the scope of the appended claims.

What is claimed is:

1. A fluid conveyance system connector, comprising:
 a body;
 a tube positioned within the body through which a conveyed fluid flows;
 a first moveable adapter received in a first space between the body and the tube and a second moveable adapter received in a second space between the body and the tube, the first and second moveable adapters sealingly cooperate with the body and tube to define respective outer and inner variable volume chambers, each inner chamber communicates with one of an external environment or the conveyed fluid through a first port and an outer chamber communicates with the other of the conveyed fluid or the external environment through a second port such that the pressure in each inner chamber is the pressure exhibited by the external environment or the conveyed fluid and the pressure in each outer chamber is the pressure of the other of the conveyed fluid or the external environment, wherein a differential pressure comprising a difference between the pressure of the conveyed fluid and the pressure exhibited by the external environment applies an inwardly or outwardly directed force to each moveable adapter; and
 a partition that separates the inner chambers from one another, the partition including the first port;
 wherein the first moveable adapter includes a first sealing portion having a first seal that sealingly engages an inner surface of the body and an external surface of the tube, and includes a third seal between the body and the first moveable adapter; and
 wherein the second moveable adapter includes a second sealing portion having a second seal that sealingly engages the inner surface of the body and the external surface of the tube, and includes a fourth seal between the body and the second moveable adapter.

2. The connector of claim 1, further including a biasing member included in at least one of the outer chambers to supplement, counter or replace the effect of the pressure of the conveyed fluid and the pressure exhibited by the external environment.

3. The connector of claim 2, wherein the biasing member is a compression spring.

4. The connector of claim 1, wherein the partition extends radially from the tube and radially external to the body.

5. The connector of claim 1, wherein each of the first seal and the second seal includes an O-ring that sealingly engages the inner surface of the body and the external surface of the tube.

6. A fluid conveyance system connector, comprising:
 a body having a flange;
 an elongated tube, positioned within the body and fixedly connected to the flange, through which a conveyed fluid flows;
 a first moveable adapter received in a first space between the body and the tube on a first end of the connector and a second moveable adapter received in a second space between the body and the tube on a second end of the connector, each moveable adapter including a sealing portion that sealingly engages an inner surface of the body and an external surface of the tube; and
 seals proximate each end of the body forming a seal between the body and each corresponding moveable adapter; and
 a partition that separates the inner chambers from one another, the partition including the port;
 wherein each moveable adapter cooperates with the body and tube to define respective outer and inner variable volume chambers, each inner chamber communicates with one of an external environment or the conveyed fluid through a port in the body or tube-and the outer chambers communicate with the other of the conveyed fluid or the external environment through a port in the moveable adapters or the body such that the pressure in inner chamber is the pressure exhibited by one of the external environment or the conveyed fluid and the pressure in the outer chambers is the pressure of the other of the conveyed fluid or the external environment, wherein a differential pressure comprising a difference between the pressure of the conveyed fluid and the pressure exhibited by the external environment applies an inwardly or outwardly directed force to each end of the connector;

wherein the first moveable adapter includes a first sealing portion having a first seal that sealingly engages an inner surface of the body and an external surface of the tube; and wherein the second moveable adapter includes a second sealing portion having a second seal that sealingly engages the inner surface of the body and the external surface of the tube.

7. The connector of claim 6, further including a biasing member included in at least one of the inner chambers to supplement, counter or replace the effect of the pressure of the conveyed fluid and the pressure exhibited by the external environment.

8. The connector of claim 7, wherein the biasing member is a compression spring.

9. The connector of claim 6, wherein the partition extends radially from the tube and radially external to the body.

10. The connector of claim 6, wherein each of the first seal and the second seal includes an O-ring that sealingly engages the inner surface of the body and the external surface of the tube.

11. A method of tuning or modifying the reaction to a vibrational input or environment in a fluid conveyance system, comprising the steps of:
   providing a connector comprising:
      a body;
      a tube positioned within the body through which a conveyed fluid flows; and
      a first moveable adapter received in a first space between the body and the tube and a second moveable adapter received in a second space between the body and the tube, each moveable adapter sealingly cooperates with the body and tube to define respective outer and inner variable volume chambers, the inner chambers communicate with one of an external environment or the conveyed fluid through a first port and the outer chambers communicate with the other of the conveyed fluid or the external environment through a second port such that the pressure in the inner chamber is the pressure exhibited by the external environment or the conveyed fluid and the pressure in the outer chambers is the pressure of the other of the conveyed fluid or the external environment, wherein a differential pressure comprising a difference between the pressure of the conveyed fluid and the pressure exhibited by the external environment applies an inwardly or outwardly directed force to the moveable adapters; and
   exposing the connector to the conveyed fluid and the external environment;
   wherein the connector further comprises a partition that separates the inner variable volume chambers from one another, the partition including the first port.

12. The method of claim 11, wherein the partition extends radially from the tube and radially external to the body.

13. The method of claim 11, the connector further comprising:
   a first moveable adapter that includes a first sealing portion having a first seal that sealingly engages an inner surface of the body and an external surface of the tube; and
   a second moveable adapter includes a second sealing portion having a second seal that sealingly engages the inner surface of the body and the external surface of the tube.

14. The method of claim 13, wherein each of the first seal and the second seal includes an O-ring that sealingly engages the inner surface of the body and the external surface of the tube.

* * * * *